(12) United States Patent
Hadfield

(10) Patent No.: US 11,302,211 B2
(45) Date of Patent: Apr. 12, 2022

(54) FLIGHT SIMULATION

(71) Applicant: BAE SYSTEMS plc, London (GB)

(72) Inventor: Richard Stephen Hadfield, Rochester (GB)

(73) Assignee: BAE SYSTEMS plc, London (GB)

( * ) Notice: Subject to any disclaimer, the term of this patent is extended or adjusted under 35 U.S.C. 154(b) by 13 days.

(21) Appl. No.: 16/964,024

(22) PCT Filed: Jan. 14, 2019

(86) PCT No.: PCT/GB2019/050084
§ 371 (c)(1),
(2) Date: Jul. 22, 2020

(87) PCT Pub. No.: WO2019/145675
PCT Pub. Date: Aug. 1, 2019

(65) Prior Publication Data
US 2021/0043104 A1 Feb. 11, 2021

(30) Foreign Application Priority Data

Jan. 26, 2018 (EP) .................................... 18275010
Jan. 26, 2018 (GB) .................................... 1801276

(51) Int. Cl.
*G09B 9/44* (2006.01)
*G09B 9/20* (2006.01)
(Continued)

(52) U.S. Cl.
CPC ............... *G09B 9/44* (2013.01); *G09B 9/203* (2013.01); *G09B 9/206* (2013.01); *G09B 9/24* (2013.01); *G09B 9/302* (2013.01); *G09B 9/307* (2013.01)

(58) Field of Classification Search
CPC . G09B 9/44; G09B 9/203; G09B 9/24; G09B 9/302; G09B 9/307; G09B 9/20; G09B 9/206; G09B 9/30
See application file for complete search history.

(56) References Cited

U.S. PATENT DOCUMENTS 9,865,175 B2 * 1/2018 Johnsson .................. G06G 7/48
2008/0206719 A1 8/2008 Johnsson et al.
(Continued)

FOREIGN PATENT DOCUMENTS

DE 4339606 A1 5/1995
EP 0399418 A2 11/1990
(Continued)

OTHER PUBLICATIONS

International Search Report and Written Opinion received for PCT Application No. PCT/GB2019/050084. dated Feb. 12, 2019. 15 pages.
(Continued)

*Primary Examiner* — Timothy A Musselman
(74) *Attorney, Agent, or Firm* — Finch & Maloney PLLC

(57) ABSTRACT

There is provided a method and apparatus for simulating a flight scenario during a live flight of an aircraft. The method comprises:
(i) generating (60) images comprising scenes relevant to the simulated flight scenario at a simulated altitude;
(ii) calculating, using live flight data received for the aircraft and with reference to a predetermined flight model (65), simulated flight data for the simulated flight scenario at the simulated altitude; and
(iii) displaying, on a display system (35) of the aircraft, the calculated simulated flight data while controlling the display of said generated scene images to simulate movement of the aircraft through the displayed scene at a rate and in a direction corresponding to the displayed simulated flight data.

(Continued)

The method and apparatus may optionally alter the response of the aircraft to control actions (70) by a pilot to simulate the response expected of the aircraft having the simulated flight characteristics.

19 Claims, 3 Drawing Sheets

(51) Int. Cl.
    *G09B 9/24*     (2006.01)
    *G09B 9/30*     (2006.01)

(56) References Cited

U.S. PATENT DOCUMENTS

2014/0377719 A1    12/2014   Johnsson et al.
2017/0294135 A1*   10/2017   Lechner .................. G09B 9/44

FOREIGN PATENT DOCUMENTS

EP           0654776 A2     5/1995
WO        03096303 A1    11/2003
WO     2019145675 A1    8/2019

OTHER PUBLICATIONS

GB Search Report under Section 17(5) received for GB Application No. 1801276.5, dated Jun. 21, 2018. 3 pages.
Extended European Search Report received for EP Application No. 18275010.9, dated Jul. 6, 2018. 8 pages.
Heasman, Paul, "Next-Gen Training To Fight Military Hawk T2," Jan. 21, 2013. 9 pages.
Barry, Jack Jr., and Schelhorn, Arno E., "In-Flight Simulators," IEEE Aerospace and Electronic Systems Magazine, vol. 1, No. 3., Mar. 30, 1986. pp. 10-16.
International Preliminary Report on Patentability received for PCT Application No. PCT/GB2019/050084. dated Aug. 6, 2020. 8 pages.

* cited by examiner

FLIGHT SIMULATION

TECHNICAL FIELD

This invention relates to a method and apparatus for simulating a flight scenario during live flight of an aircraft.

BACKGROUND

Ground-based flight training simulators are able to provide both a visual and a physical flight simulation experience to a pilot operating the simulator, intended to replicate actual flight conditions. Ground-based simulators are used in particular to provide training to pilots in the operation of particular types of aircraft and flight according to particular flight scenarios, such as landing and low-level flying. Known ground-base simulators are however limited in the range of experiences they can provide to a pilot.

SUMMARY OF THE INVENTION

According to a first aspect disclosed herein, there is provided a method for simulating a flight scenario during a live flight of an aircraft, the simulated flight scenario comprising flight characteristics that are different to the live flight characteristics of the aircraft, the method comprising:
(i) generating images comprising scenes relevant to the simulated flight scenario at a simulated altitude;
(ii) calculating, using live flight data received for the aircraft and with reference to a predetermined flight model, simulated flight data for the simulated flight scenario at the simulated altitude; and
(iii) displaying, on a display system of the aircraft, the calculated simulated flight data while controlling the display of said generated scene images to simulate movement of the aircraft through the displayed scene at a rate and in a direction corresponding to the displayed simulated flight data.

Embodiments disclosed herein aim to display to the pilot of an aircraft a virtual terrain through which to fly or in which to practice landing the aircraft and to generate and display simulated flight data derived from the received live flight data. Performance of the simulated flight during live flight of the aircraft enables a pilot to have a more realistic experience than typically provided in ground-based flight simulators.

In an example, the simulated flight data comprise one or more of: simulated aircraft speed relative to Earth; simulated altitude; simulated direction of flight; and simulated aircraft orientation. The simulated flight data may be displayed as a combination of symbols and data as is conventional in aircraft display systems.

In an example, (ii) comprises converting received live flight data to compensate for differences in flight characteristics of the aircraft when flying at the altitude of live flight as compared with predetermined flight characteristics of the aircraft, defined in the flight model, when flying at the simulated altitude.

In an example, the method comprises:
(iv) adjusting the response of a flight control system of the aircraft to flight control actions by the pilot to simulate a response expected of the aircraft to the flight control actions by the pilot in the simulated flight scenario.

In an example, (iv) comprises adjusting the response of the flight control system of the aircraft to flight control actions by the pilot to simulate a response expected of a different type of aircraft when flying according to the simulated flight scenario.

This enables the pilot of a trainer aircraft, for example, to have the feeling of flying the simulated flight scenario in a front-line fighter aircraft, for example.

In an example, (iv) comprises adjusting the response of the aircraft to movements by the pilot of an inceptor or of a throttle control. In this way, the pilot may experience forces expected when flying the aircraft, or a different aircraft, according to the simulated flight scenario.

In an example, the altitude of live flight is greater than the simulated altitude. In this way, simulated flight scenarios may be practiced at a safe altitude.

In an example, the simulated flight scenario comprises a simulation of low-level flying through terrain represented in the displayed scene images.

In an example, the simulated flight scenario comprises a simulation of an aircraft carrier flight deck for the purpose of simulating a landing of the aircraft on an aircraft carrier flight deck represented in the displayed scene images.

In an example, the display of the aircraft is a helmet-mounted display worn by a pilot of the aircraft. Alternatively, or in addition, the display of the aircraft is a head-up or head-down display.

In an example, the method comprises:
(v) terminating the display of images of the simulated flight scenario and of the simulated flight data in the event of detecting a potentially hazardous condition for the aircraft. The potentially hazardous condition may comprise one or more of: detection of unallowable live flight characteristics of the aircraft; presence of another aircraft or object within a predetermined distance of the aircraft; incapacity or reduced capacity of the pilot.

According to a second aspect disclosed herein, there is provided an aircraft flight simulator, associated with a display system of an aircraft, for simulating a flight scenario during a live flight of an aircraft, comprising:
a scenery generator for generating and outputting to the display system scene images of a simulated flight scenario;
a flight model for modelling flight characteristics expected of the aircraft when flying according to one or more simulated flight scenarios;
a flight simulation controller for controlling the output of the scenery generator according to flight characteristics modelled by the flight model thereby to provide a flight simulation experience to a pilot of the aircraft during live flight of the aircraft.

In an example of the aircraft flight simulator, the flight simulation controller is configured to implement the method as described above according to the first aspect disclosed herein.

According to a third aspect disclosed herein, there is provided an aircraft, configured to simulate one or more flight scenarios during live flight of the aircraft, the aircraft implementing the method as described above according to the first aspect disclosed herein.

BRIEF DESCRIPTION OF THE DRAWINGS

Example embodiments of the invention will now be described in more detail with reference to the accompanying drawings, of which.

DETAILED DESCRIPTION

There follows a description of embodiments of a flight simulating method and apparatus arranged to simulate flight scenarios in an aircraft, for example for training purposes, during live flight of the aircraft. In particular, a pilot of the aircraft may fly the aircraft according to a simulated flight scenario while flying at a safe altitude. The simulated flight scenarios may comprise training flight scenarios including low-level flying or landing scenarios. A simulated landing scenario may be for example a simulated aircraft carrier flight deck or other simulated landing type in a variety of conditions or locations.

Low-level flying can be dangerous for the air crew and causes disturbance to those living on the flight path. It is therefore beneficial in a number of ways to be able to simulate training flight scenarios while flying at a higher, safer altitude. In particular, simulations provided during live flight enable the pilot to experience the g-forces and other factors expected in live flight rather than the more limited experiences typically provided in a ground-based flight simulator. For comparison, a typical ground based flight simulator will firstly be described in outline with reference to FIG. 1.

Figure 1:
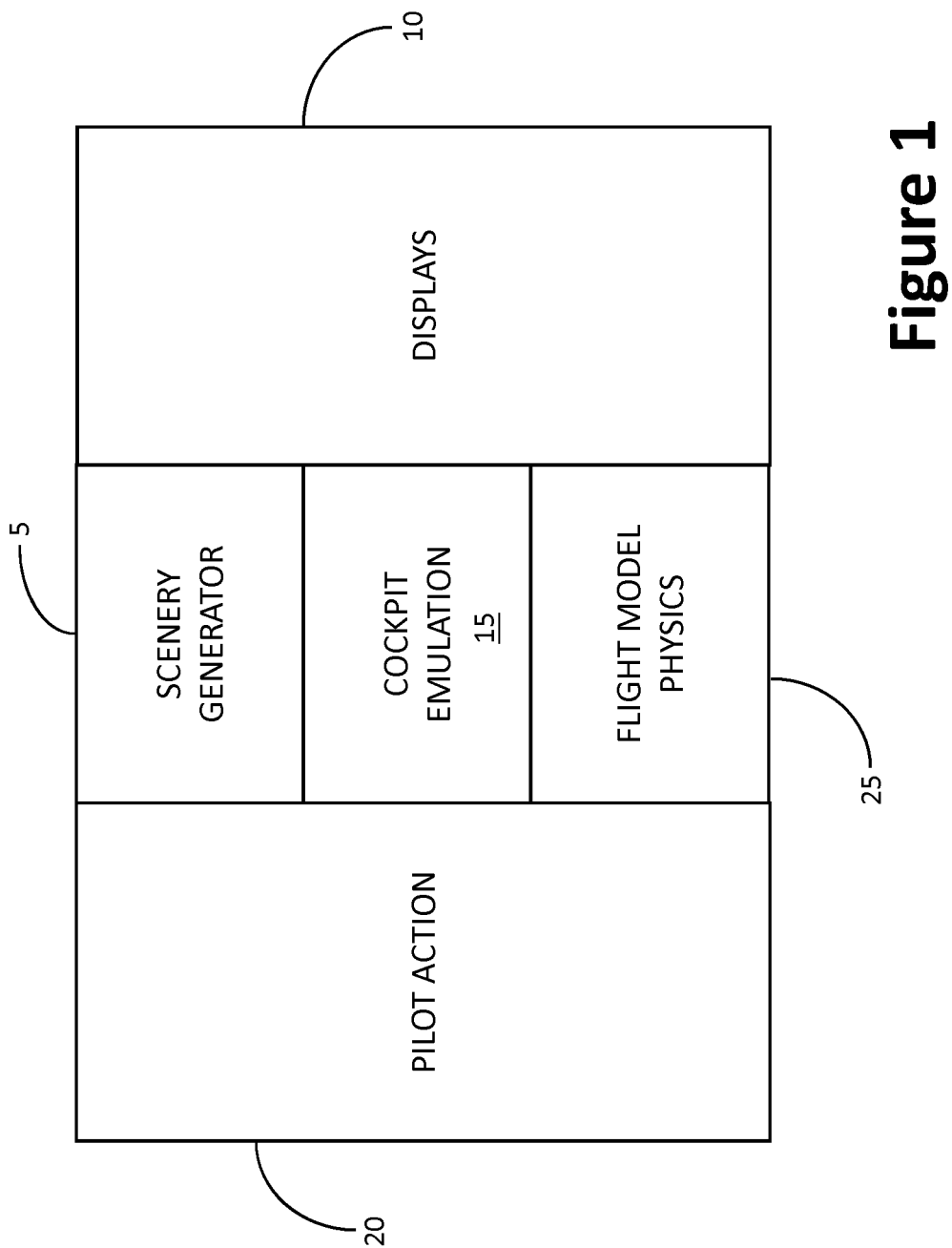
FIG. 1 is a block diagram showing functions of an example ground-based flight simulator.

Referring to FIG. 1, a block diagram is provided showing the principle features and functions of a typical ground-based flight simulator. A scenery generator 5 outputs to one or more displays 10 images of a changing scene as may viewed from a cockpit by a pilot during real flight of an aircraft. Other features of an aircraft cockpit may be emulated (15) with a combination of physical features such as a flight control inceptor and a throttle control, and images of features such as cockpit instruments which may be generated and output to the one or more displays 10.

Pilot actions 20, such as movements of the flight control inceptor or throttle control, are interpreted according to pre-configured flight model physics 25 to cause appropriate changes in the displayed imagery, including the generated scenery (5) and any emulated cockpit instruments (15). The one or more displays 10 may include any one or more of a screen for displaying images output by the scenery generator 5 and for the purposes of cockpit emulation 15, a head-up or head-down display and a head or helmet-mounted display.

In a conventional aircraft, as will now be described in outline with reference to FIG. 2, there are typically no features provided for the purposes of flight simulation.

Figure 2:
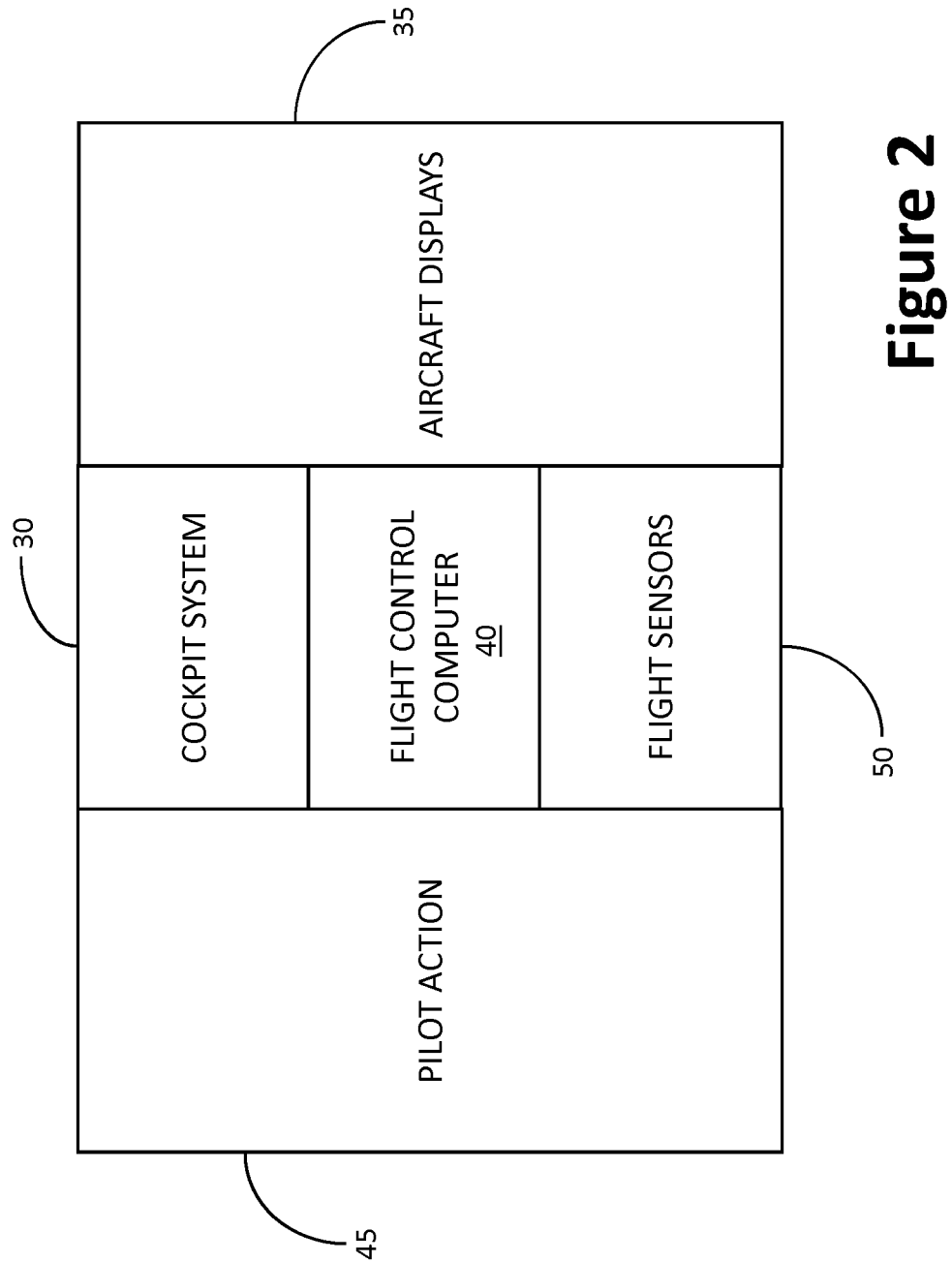
FIG. 2 is a block diagram showing an example set of features and functions of an aircraft.

Referring to FIG. 2, a block diagram shows an example set of features and functions of an aircraft including a cockpit system 30, typically comprising a pilot's flight controls and cockpit instruments. One or more displays 35 are provided to display output by a flight control computer 40 and other image and data sources within the aircraft. The displayed output may include flight data, symbols and other display artifacts which may be displayed fixed relative to the display, relative to the aircraft or relative to the Earth. The flight control computer 40 controls flight of the aircraft, interpreting pilot action 45, for example movement of the flight controls, to cause corresponding movement of the aircraft's flight control surfaces. The flight control computer 40 takes account of outputs by the aircraft's flight sensors 50 and pre-configured flight control criteria and models in its control of the aircraft. The flight control computer 40 may also control the amount of any tactile feedback provided to the pilot through a flight control inceptor of the cockpit system 30.

An aircraft according to embodiments disclosed herein will now be described with reference to FIG. 3. Such an aircraft may be arranged to implement particular functional features of the ground-based simulator described above with reference to FIG. 1. Such an aircraft may optionally incorporate features to change the response of the aircraft during a flight simulation mode of operation to provide a pilot experience that is more consistent with that expected when flying according to a simulated flight scenario.

Figure 3:
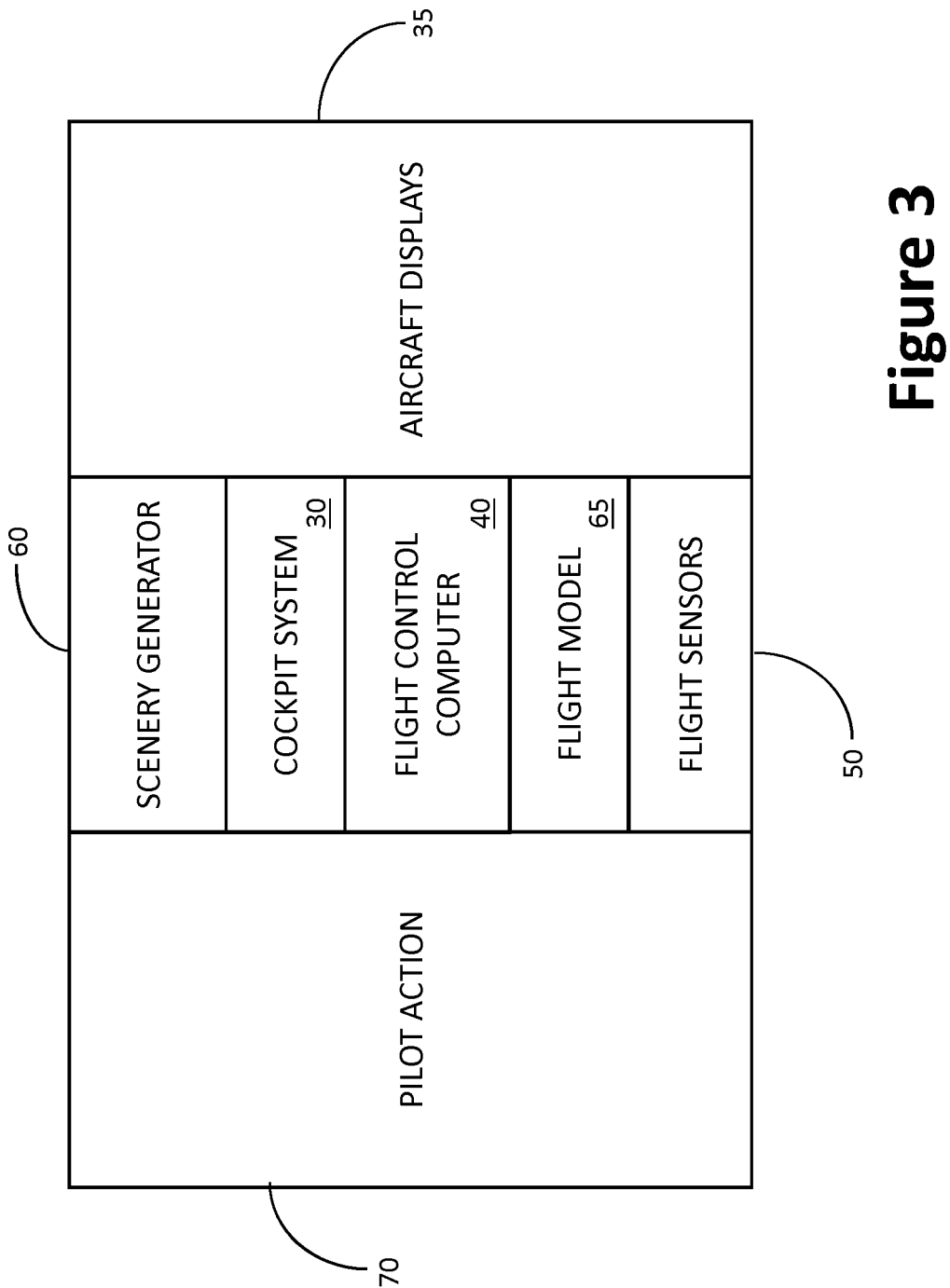
FIG. 3 is a block diagram showing an example set of features and functions of an aircraft according to the present disclosure.

Referring to FIG. 3, a block diagram shows components of an aircraft incorporating additional features to enable a pilot to experience flying the aircraft according to simulated flight scenarios during live flight. The cockpit system 30, the one or more displays 35, the flight control computer 40 and the flight sensors 50 are provided as for a conventional aircraft, as shown in FIG. 2. However, the flight control computer 40 may be modified to include simulation control functionality to implement a flight simulation mode of operation. Alternatively or in addition, further data processing capability may be added (not shown in FIG. 3) to implement some or all of the simulation control functionality for a simulation mode of operation of the aircraft.

In particular, the simulation control functionality controls a scenery generator 60, arranged to output to the one or more displays 35 images or video of a changing life-like real-world scene and/or moving map, simulating a view from the cockpit as would be expected when flying according to a simulated flight scenario. The scenery generator 60 may store scene images and video relevant to each simulated flight scenario, including digital terrain elevation data (DTED) for a selected region, and images and video captured from aerial photography. Alternatively, the features shown in generated images may be synthesised.

The simulation control functionality is also configured to interact with a flight model 65. The flight model 65 is configured to model flight characteristics expected of the aircraft when flying according to one or more simulated flight scenarios. The flight model 65 is configured, in particular, to generate simulated flight data for output to the one or more displays 35 to be overlain upon displayed scene imagery or video output by the scenery generator 60. The flight model 65 converts actual flight data received from the flight sensors 50 including position data, air/ground speed, direction, altitude and aircraft orientation relative to earth, into simulated flight data for output to the one or more displays 35.

The conversion is made, for example, according to modelled differences in flight characteristics of the aircraft in actual flight as compared with flight characteristics expected of the aircraft when flying according to the simulated flight scenario. For example, any one or more of a displayed simulated altitude, air speed, ground speed and aircraft orientation relative to the Earth and simulated rates of change in any of these data are converted according to the flight model 65 from the respective sensed (50) altitude, airspeed, ground speed and aircraft orientation relative to the Earth and sensed rates of change in these data.

In order to provide an immersive and realistic simulation, the simulation control functionality controls the scenery generator 60 to update the displayed scene images based upon the simulated flight data generated by the flight model 65. The aim is to provide to the pilot a true impression of flying through the simulated scene. If provided for training purposes, for the training to be worthwhile, the muscle memory that the pilot develops during the training needs to correctly reflect the training scenario. To achieve this, the pilot also needs to experience realistic g-forces of flight and the physical and mental demands of flying an aircraft.

The flight model 65 may be configured to model adjustments to the response of flight controls in the cockpit system 30 to pilot actions 70 when the aircraft is operating in a simulation mode, so that the pilot experiences the same or similar forces as would be expected under the simulated flight conditions. These adjustments may relate to either or both of a response of the aircraft to pilot actions 70, and to tactile feedback provided to the pilot in response to pilot actions 70. In either case, the flight control computer 40 may be configured to implement the adjustments determined by the flight model 65 when operating in the simulation mode.

The inceptor system provided in the cockpit system 30 may be configured to implement some of the modelled (65) changes in response of the aircraft where those changes relate, for example, to changes in the tactile feedback provided through the inceptor system to the pilot. If a fully active inceptor system is provided, the effect of an applied inceptor movement by the pilot and the tactile feedback provided through the inceptor may be adjusted to achieve the expected flight characteristics of the simulated flight scenario.

Adjustments modelled by the flight model 65 may for example include:
- differences in the response of the aircraft against pilot action 70, and/or the tactile forces to be applied in response to a given pilot action 70;
- differences in the roll rate to be displayed in the simulation—for example, the roll rate will increase for the same control input (70) at higher speed;
- differences in the changing g-force expected to be felt for a given changing inceptor input (70)—for example, a given change of pitch control input (70) at a higher speed will cause a higher change in g-force;
- differences in throttle response and point of afterburner engagement—for example, the throttle response and point of afterburner engagement will be dependent upon aircraft speed, as will the throttle position; and
- differences in the speed at which flight control surfaces, e.g. flaps and rudder, and other landing aids are deployed—for example, the speed at which flaps and other landing aids are deployed may vary with altitude;
- differences in airframe, e.g. to configure the inceptors 30 and display system 35 of the aircraft to respond and to provide feedback to the pilot as if the pilot is flying a different type of aircraft. For example, the aircraft may be a trainer aircraft and the flight model 65 may be configured to model differences between the flight characteristics of the trainer aircraft and the flight characteristics of a 'front-line' fighter aircraft.

In each case, the respective simulated flight data may be adjusted and displayed with reference to the flight model 65 according to the modelled differences, as would be apparent to a person of ordinary skill in the relevant art, to be appropriate to the simulated flight scenario given the actual flight characteristics sensed (50) for the aircraft.

For example, at higher altitudes than the simulated altitude, the stall speed of the aircraft will be higher due to the reduced air density. If simulating flying at close to sea-level, the displayed simulated air speed will need to be less than the actual air speed of the aircraft. The simulated scenery generator 60 will be controlled by the simulation control functionality according to this simulated ground speed rather than the actual ground speed of the aircraft. Similarly, flying faster will create more g-force in a turn of the same radius. However, the same rate of turn will be experienced for the same bank angle, so, by displaying a reduced ground speed through the simulation, an accurate simulated aircraft behaviour can be achieved.

Modern aircraft make use of head-up displays and more recently, helmet mounted displays. These displays conventionally present aircraft speed, altitude, and rates of turn and climb so that the pilot does not need to look at instruments provided in the cockpit system 30. This invention enables instruments provided in the cockpit system 30 to remain true and to display flight data according to the actual flight of the aircraft. However, the flight data output for display on the head-up or helmet-mounted display 35 may correspond to the simulated flight scenario.

A simulated flight scenario may present similar data and imagery for use in flight to the data and imagery presented in typical ground-based simulations. These include for example surface height, surface imagery and vertical obstructions. In addition, simulated targets, hostile elements, friendly elements and other features may be introduced into the simulated scene. The introduction of such hostile and friendly elements may be controlled from ground-based operators and may represent other aircraft flying in the same simulated area but physically at a safe separation. Introduction of such elements may alternatively be completely automated.

Various safety features may be implemented to ensure that the safety of the aircraft is not compromised by a pilot's actions 70 when acting with reference to the displayed imagery and flight data of a simulated flight scenario. For example, the simulation control functionality may include functionality to disengage the simulation mode of operation: 1) on detection of a genuine system failure; 2) if another aircraft is detected entering a simulation exclusion area around the aircraft; 3) if the aircraft requires pilot intervention to regain control; or 4) if the pilot disengages the simulation. In each case, any flight data to be displayed by the aircraft displays 35 may immediately change from simulated flight data to actual flight data and the scenery generator 60 ceases generation of artificial scenery.

The data processing capability for implementing the simulation control functionality described above may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method for simulating a flight scenario during a live flight of an aircraft, the simulated flight scenario comprising one or more simulated flight characteristics that are different to live flight characteristics of the aircraft, the method comprising:
    generating images comprising scenes relevant to the simulated flight scenario at a simulated altitude;
    calculating, using live flight data received for the aircraft and with reference to a predetermined flight model, simulated flight data for the simulated flight scenario at the simulated altitude;
    displaying, on a display system of the aircraft, the calculated simulated flight data while controlling the display of said generated scene images to simulate movement of the aircraft through the displayed scene at a rate and in a direction corresponding to the displayed simulated flight data; and
    adjusting, based on the simulated flight data, tactile feedback provided to a pilot in response to flight control actions by the pilot.

2. The method according to claim 1, wherein the simulated flight data comprises: simulated aircraft speed relative to Earth; simulated altitude; simulated direction of flight; and/or simulated aircraft orientation.

3. The method according to claim 1, wherein calculating the simulated flight data comprises converting received live flight data to compensate for differences in flight characteristics of the aircraft when flying at the altitude of live flight as compared with predetermined flight characteristics of the aircraft, defined in the flight model, when flying at the simulated altitude.

4. The method according to claim 1, comprising:
    adjusting a response of a flight control system of the aircraft to flight control actions by a pilot of the aircraft to simulate a response expected of the aircraft to the flight control actions by the pilot in the simulated flight scenario.

5. The method according to claim 1, comprising:
    adjusting the response of a flight control system of the aircraft to flight control actions by a pilot of the aircraft to simulate a response expected of a different type of aircraft when flying according to the simulated flight scenario.

6. The method according to claim 4, wherein adjusting the response of the flight control system comprises adjusting the response of the aircraft to movements by the pilot of an inceptor or of a throttle control.

7. The method according to claim 1, wherein the altitude of live flight is greater than the simulated altitude.

8. The method according to claim 1, wherein the simulated flight scenario comprises a simulation of low-level flying through terrain represented in the displayed scene images.

9. The method according to claim 1, wherein the simulated flight scenario comprises a simulation of an aircraft carrier flight deck for the purpose of simulating a landing of the aircraft on an aircraft carrier flight deck represented in the displayed scene images.

10. The method according to claim 1, wherein the display of the aircraft comprises: a helmet-mounted display worn by a pilot of the aircraft; a head-up display; and/or a head-down display.

11. The method according to claim 1, comprising:
    terminating the display of images of the simulated slight scenario and of the simulated flight data in response to an actual event during the live flight.

12. The method according to claim 11, wherein the actual event is a potentially hazardous condition for the aircraft, the potentially hazardous condition comprises: detection of one or more unallowable live flight characteristics of the aircraft; presence of another aircraft or object within a predetermined distance of the aircraft; and/or incapacity or reduced capacity of a pilot of the aircraft.

13. An aircraft flight simulator, associated with a display system of an aircraft, for simulating a flight scenario during a live flight of the aircraft, comprising:
    a scenery generator for generating and outputting to the display system scene images of a simulated flight scenario;
    a flight model for modelling flight characteristics expected of the aircraft when flying according to the simulated flight scenario; and
    a flight simulation controller for controlling the output of the scenery generator according to one or more flight characteristics modelled by the flight model thereby to provide a flight simulation experience to a pilot of the aircraft during live flight of the aircraft,
    wherein the flight simulation controller is configured to:
    calculate, using live flight data received for the aircraft and with reference to the flight model, simulated flight data for the simulated flight scenario at a simulated altitude;
    display, on the display system, the calculated simulated flight data while controlling the display of said scene images to simulate movement of the aircraft through the displayed scene at a rate and in a direction corresponding to the displayed simulated flight data; and
    adjust, based on the simulated flight data, tactile feedback provided to a pilot in response to flight control actions by the pilot.

14. An aircraft, configured to simulate one or more flight scenarios during live flight of the aircraft, the aircraft implementing the method according to claim 1.

15. A computer program product including one or more non-transitory machine-readable mediums encoded with instructions that when executed by one or more processors cause a process to be carried out for simulating a flight scenario during a live flight of an aircraft, the simulated flight scenario comprising one or more simulated flight characteristics that are different to live flight characteristics of the aircraft, the process comprising:

generating images comprising scenes relevant to the simulated flight scenario at a simulated altitude;

calculating, using live flight data received for the aircraft and with reference to a predetermined flight model, simulated flight data for the simulated flight scenario at the simulated altitude; and displaying, on a display system of the aircraft, the calculated simulated flight data while controlling the display of said generated scene images to simulate movement of the aircraft through the displayed scene at a rate and in a direction corresponding to the displayed simulated flight data; and adjusting, based on the simulated flight data, tactile feedback provided to a pilot in response to flight control actions by the pilot.

16. The computer program product according to claim 15, wherein:

the simulated flight data comprises simulated aircraft speed relative to Earth, simulated altitude, simulated direction of flight, and/or simulated aircraft orientation;

the altitude of live flight is greater than the simulated altitude;

the simulated flight scenario comprises a simulation of low-level flying through terrain represented in the displayed scene images; and/or the simulated flight scenario comprises a simulation of an aircraft carrier flight deck for the purpose of simulating a landing of the aircraft on an aircraft carrier flight deck represented in the displayed scene images.

17. The computer program product according to claim 15, wherein calculating the simulated flight data comprises converting received live flight data to compensate for differences in flight characteristics of the aircraft when flying at the altitude of live flight as compared with predetermined flight characteristics of the aircraft, defined in the flight model, when flying at the simulated altitude.

18. The computer program product according to claim 15, the process comprising:

adjusting the response of a flight control system of the aircraft to flight control actions by a pilot of the aircraft to simulate a response expected of the aircraft to the flight control actions by the pilot in the simulated flight scenario;

adjusting the response of the flight control system of the aircraft to flight control actions by the pilot to simulate a response expected of a different type of aircraft when flying according to the simulated flight scenario; and/or terminating the display of images of the simulated slight scenario and of the simulated flight data in response to an actual event during the live flight.

19. An aircraft comprising the computer program product according to claim 15.

* * * * *